(12) United States Patent
Ficheux et al.

(10) Patent No.: US 10,857,962 B2
(45) Date of Patent: Dec. 8, 2020

(54) CABIN-PROTECTION STRUCTURE AND TRACTOR

(71) Applicant: KUBOTA CORPORATION, Osaka (JP)

(72) Inventors: David Ficheux, Argenteuil (FR); Thibault Dussaussois, Argenteuil (FR); Philippe Dedavrichewy, Argenteuil (FR); Mitsuhiko Obe, Sakai (JP)

(*) Notice: Subject to any disclaimer, the term of this patent is extended or adjusted under 35 U.S.C. 154(b) by 63 days.

(21) Appl. No.: 16/255,887

(22) Filed: Jan. 24, 2019

(65) Prior Publication Data
US 2019/0225176 A1 Jul. 25, 2019

(30) Foreign Application Priority Data
Jan. 25, 2018 (EP) .................................... 18305062

(51) Int. Cl.
| | |
|---|---|
| *B62D 25/06* | (2006.01) |
| *B60R 21/11* | (2006.01) |
| *B60R 21/13* | (2006.01) |
| *B62D 33/06* | (2006.01) |
| *B60R 21/00* | (2006.01) |
| *B62D 49/06* | (2006.01) |

(52) U.S. Cl.
CPC ............ *B60R 21/11* (2013.01); *B60R 21/131* (2013.01); *B62D 25/06* (2013.01); *B62D 33/0617* (2013.01); *B60R 2021/003* (2013.01); *B60R 2021/0018* (2013.01); *B60R 2021/0076* (2013.01); *B62D 49/06* (2013.01)

(58) Field of Classification Search
CPC .... B62D 33/06; B62D 33/0617; B62D 49/06; B62D 25/06; B60R 21/11; B60R 21/131; B60R 2021/0018; B60R 2021/0076; B60R 2021/00779
USPC ...... 296/190.03, 190.08; 180/89.13; 280/756
See application file for complete search history.

(56) References Cited

U.S. PATENT DOCUMENTS

| | | | | |
|---|---|---|---|---|
| 4,095,839 A | * | 6/1978 | Lawrence ............... | B60R 21/11 296/190.03 |
| 7,131,686 B1 | * | 11/2006 | Jo .......................... | B60R 21/02 296/190.03 |
| 8,998,253 B2 | * | 4/2015 | Novotny ................. | B60R 21/13 280/756 |
| 9,469,966 B2 | * | 10/2016 | Abe ......................... | E02F 9/24 |
| 2002/0135207 A1 | * | 9/2002 | Sakyo ................... | B60R 21/131 296/190.08 |
| 2003/0111281 A1 | * | 6/2003 | Jo .......................... | B60R 21/11 180/89.13 |

(Continued)

FOREIGN PATENT DOCUMENTS

| | | |
|---|---|---|
| EP | 1728689 A1 | 12/2006 |
| JP | H0557047 A1 | 7/1993 |

(Continued)

*Primary Examiner* — Gregory A Blankenship
(74) *Attorney, Agent, or Firm* — Cabinet Beau de Lomenie; Robert A. Facey

(57) ABSTRACT

The present disclosure achieves a cabin-protection structure and a tractor, each of which has improved usability. Provided is a cabin-protection structure (30) for a tractor (1). The tractor (1) includes: a cabin framework (50) that defines a cabin (12) containing an operation device; a roof (20) provided above the cabin framework (50). The cabin-protection structure (30) is provided above the roof (20).

11 Claims, 2 Drawing Sheets

(56) References Cited

U.S. PATENT DOCUMENTS

| | | | |
|---|---|---|---|
| 2007/0205633 A1* | 9/2007 | Waco | B60H 1/00378 296/190.09 |
| 2009/0127888 A1* | 5/2009 | Tsukamoto | B62D 33/0617 296/190.03 |
| 2014/0292032 A1 | 10/2014 | Sasaki et al. | |
| 2015/0000996 A1* | 1/2015 | Nagami | B60K 11/04 180/291 |
| 2015/0123428 A1* | 5/2015 | Hwang | B62D 33/06 296/190.03 |
| 2015/0298749 A1* | 10/2015 | Zurinski | E02F 9/163 296/190.08 |
| 2016/0114838 A1* | 4/2016 | Salvini | B60J 10/00 296/190.03 |
| 2019/0225176 A1* | 7/2019 | Ficheux | B60R 21/11 |
| 2019/0322322 A1* | 10/2019 | Jha | B60H 1/00564 |

FOREIGN PATENT DOCUMENTS

| | | | |
|---|---|---|---|
| JP | 2003146164 A1 | 5/2003 | |
| JP | 2013173497 A1 | 9/2013 | |

\* cited by examiner

CABIN-PROTECTION STRUCTURE AND TRACTOR

TECHNICAL FIELD

The present disclosure relates to a cabin-protection structure and to a tractor.

BACKGROUND

In general, a construction machine includes a cabin-protection structure. Examples of the function fulfilled by the cabin-protection structure encompass (i) protection of an operator from a falling object and (ii) protection of an operator should the construction machine tip over and/or falls.

Patent Literature 1 discloses a conventional tractor (see FIGS. 1 and 2 of Patent Literature 1). The tractor disclosed in Patent Literature 1 includes (i) an internal frame 10, (ii) a plurality of members 24 and 26a through 26d, (iii) and a roof panel 43. The plurality of members 24 and 26a through 26d are provided at a top part of the internal frame 10. The members 26a through 26d protect an operator from a falling object (see paragraph [0081]). The roof panel 43 is provided above the plurality of members 24 and 26a through 26d.

According to the conventional tractor, the internal frame 10, the plurality of members 24 and 26a through 26d, and the roof panel 43 are thus provided in this order.

CITATION LIST

Patent Literature

[Patent Literature 1]
Specification of U.S. Patent Application Publication No. 2016/0114838 (Publication Date: Apr. 28, 2016)

SUMMARY OF THE DISCLOSURE

Technical Problem

However, the inventors have recognized that the tractor disclosed in Patent Literature 1 presents, for example, the following problems (1) through (3):

(1) The plurality of members, which are included in the internal frame, are welded together so as to be rigidly secured together (see paragraphs [0070], [0081], and the like). It is therefore difficult to remove the plurality of members from the internal frame 10 after the welding of the plurality of members is finished.

(2) The roof panel 43 is provided above the plurality of members 24 and 26a through 26d. Therefore, should a falling object strike the tractor, the roof panel 43 may be damaged first. Depending on a material for the roof panel 43, it may be necessary to frequently replace the roof panel 43. That is, a conventional roof panel is not sufficiently recognized as an object to be protected from a falling object. (3) Because of the problem (1) above, it is difficult to adjust a height of an entire portion of the tractor disclosed in Patent Literature 1. Therefore, the tractor of Patent Literature 1 can only be accommodated in a space having a certain height.

As evidenced by the various problems above, the conventional tractor has room for improvement in terms of usability.

Embodiments of the present disclosure has been made in view of the problems, and an object of the present disclosure is to achieve a cabin-protection structure and a tractor, each of which has improved usability.

In order to attain the object, there is disclosed a cabin-protection structure for a tractor, the tractor including: a cabin framework that defines a cabin containing an operation device; and a roof provided above the cabin framework, the cabin-protection structure being provided above the roof.

With the configuration, the roof is provided between the cabin-protection structure and the cabin framework. This may allow the tractor to be structured so that it is unnecessary to weld the cabin framework and the cabin-protection structure to each other. It is therefore possible to facilitate removing a cabin framework from a cabin-protection structure.

In addition, the cabin-protection structure is provided above the roof. With this configuration, it may be possible for the cabin-protection structure to protect not only an operator of the tractor but also the roof should a falling object strike the tractor which includes the cabin-protection structure.

Furthermore, when the cabin-protection structure is configured to be detachable from the roof, adjusting a height of the tractor may be facilitated. For example, when a space to accommodate the tractor is low in height, it may be sufficient to remove the cabin-protection structure from the roof.

With the configuration, the cabin-protection structure can have usability which is thus improved.

In order to attain the object, a tractor in accordance with an embodiment of the present disclosure is a tractor including: a cabin framework that defines a cabin containing an operation device; a roof provided above the cabin framework; and a cabin-protection structure provided above the roof.

With the configuration, an advantageous effect similar to the advantageous effect of the cabin-protection structure may be obtained.

Advantageous Effects of Invention

According to embodiments of the present disclosure, it is possible to provide a cabin-protection structure and a tractor, each of which may present improved usability.

DETAILED DESCRIPTION

Figure 2:
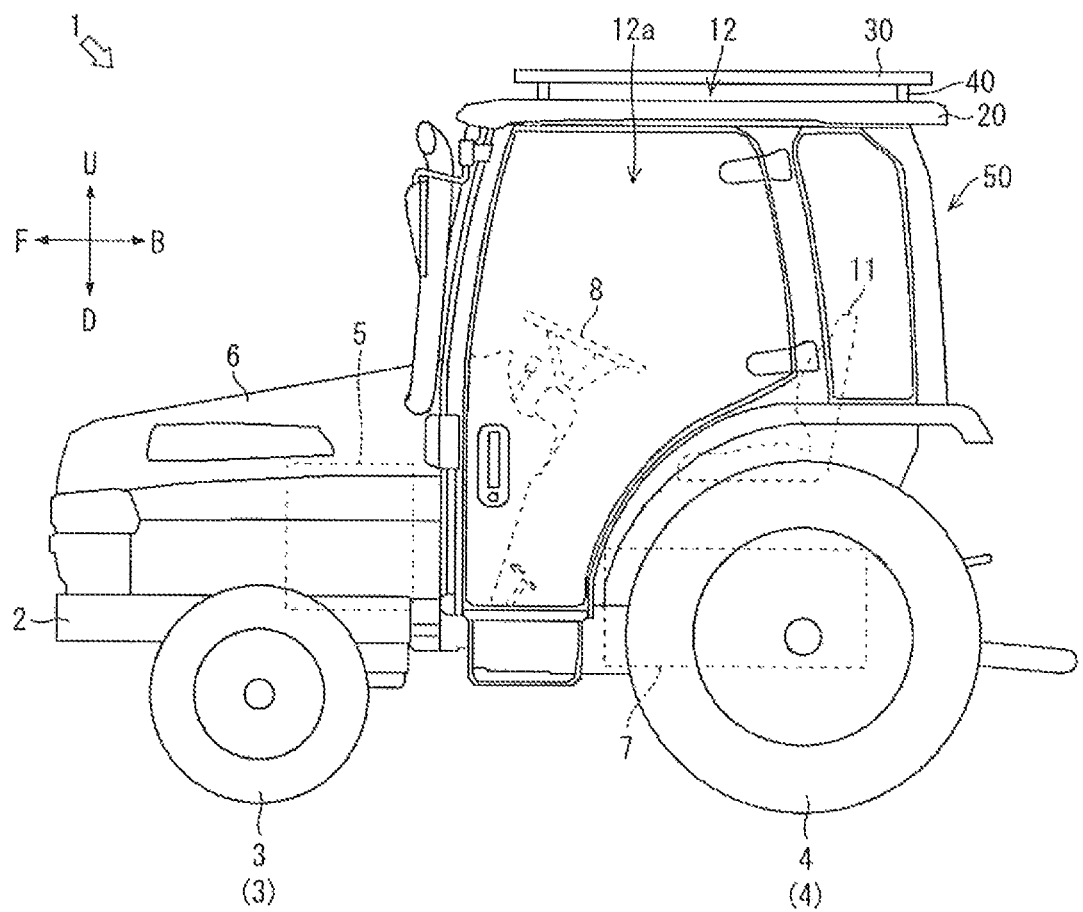
FIG. 2 is a view illustrating an overall configuration of a tractor in accordance with the present embodiment.

In the following description, an arrow U, an arrow D, an arrow F, an arrow B, an arrow L, and an arrow R in FIGS. 2 and 3 refer to an upward direction, a downward direction, a frontward direction, a backward direction, a leftward direction, and a rightward direction, respectively.

[Tractor 1]

An overall configuration of a tractor 1 will be described first with reference to FIG. 2. FIG. 2 is a view illustrating the overall configuration of the tractor 1.

The tractor 1 includes a body frame 2, front wheels 3, rear wheels 4, an engine 5, a hood 6, a transmission 7, a steering wheel 8, a seat 11, a cabin 12, a cabin framework 50, a roof 20, a cabin-protection structure 30, and support members 40.

The body frame 2 is provided so that a longer side of the body frame 2 extends in the frontward direction and the backward direction. A front part of the body frame 2 is supported by the lateral pair of front wheels 3 with a front axle mechanism (not illustrated) provided between the front part of the body frame 2 and the lateral pair of front wheels 3. The transmission 7 is provided at a rear part of the body frame 2. A rear part of the transmission 7 is supported by the lateral pair of rear wheels 4 with a rear axle mechanism (not illustrated) provided between the rear part of the transmission 7 and the lateral pair of rear wheels 4. The engine 5 is provided at the front part of the body frame 2. The engine 5 is covered with the hood 6.

Motive power of the engine 5 is changed in speed by the transmission 7, and then (i) transmitted to the front wheels 3 via the front axle mechanism and (ii) transmitted to the rear wheels 4 via the rear axle mechanism. The motive power of the engine 5 drives the front wheels 3 and the rear wheels 4 to each rotate. This allows the tractor 1 to run.

The cabin 12 is provided behind the engine 5. In the cabin 12, there is provided a space 12a in which an operator may ride. In the space 12a, the following, for example, are contained: (i) an operation device (e.g., the steering wheel 8 for controlling an angle in which the front wheels 3 are to be steered, and various operation tools); and (ii) the seat 11 on which the operator is to sit.

The roof 20 is provided above the cabin framework 50. Specifically, the roof 20 is attached to the cabin framework 50 with use of, for example, (i) bolts and nuts or (ii) screws.

The cabin-protection structure 30 is provided above the roof 20 with the plurality of support members 40 which are provided between the cabin-protection structure 30 and the roof 20.

[Cabin Framework 50]

The cabin framework 50 will be described below with reference to FIG. 3. FIG. 3 is a view for describing an example of the cabin framework 50 in accordance with the present embodiment.

The cabin framework 50 includes (i) a lateral pair of supporting columns 52a and 52b which are provided at a front part of the cabin framework 50 and (ii) a lateral pair of supporting columns 53a and 53b which are provided at a rear part of the cabin framework 50. The cabin framework 50 further includes (i) a beam 54 which connects together respective top parts of the lateral pair of supporting columns 52a and 52b and (ii) a beam 55 which connects together respective top parts of the lateral pair of supporting columns 53a and 53b. The cabin framework 50 further includes (i) a beam 56a which connects together the respective top parts supporting columns 52a and 53a that are located on a left side and (ii) a beam 56b which connects together the respective top parts of the supporting columns 52b and 53b that are located on a right side. The cabin framework 50 further includes (i) a beam 58 which connects together respective bottom parts of the lateral pair of supporting columns 53a and 53b and (ii) a pair of beams 59a and 59b. The beam 59a connects together respective bottom parts of the supporting columns 52a and 53a on the left side. The beam 59b connects together respective bottom parts of the supporting columns 52b and 53b on the right side. The cabin framework 50 thus defines, by the plurality of beams assembled in a form of a box-like frame, the cabin 12 which is to contain the operation device.

Rear parts of the beams 59a and 59b are each formed in a shape of a circular arc so as to correspond to respective rear wheel fenders (not illustrated) of the tractor. A lateral pair of side panels 60a and 60b are attached at respective lower parts of the beams 59a and 59b. To a bottom surface of the cabin framework 50, a floor sheet is attached. A front panel, door panels, a rear panel, and the roof 20 are respectively attached to a front surface, side surfaces, a back surface, and a ceiling of the cabin framework 50 (none of these is illustrated in FIG. 3).

At a front side of a top part of the cabin framework 50, a skylight frame 62 is provided. The skylight frame 62 has a top surface which is formed flat. The skylight frame 62 includes a front-side frame 62a and a rear-side frame 62b. The front-side frame 62a is welded to the beam 54. The rear-side frame 62b is welded to a skylight attachment beam 61 which is provided so as to bridge between the beams 56a and 56b. Note that the front-side frame 62a can be attached to the beam 54 by another method in which, for example, bolts and nuts are used. Note also that the rear-side frame 62b can be attached to the skylight attachment beam 61 by another method in which, for example, bolts and nuts are used.

Figure 3:
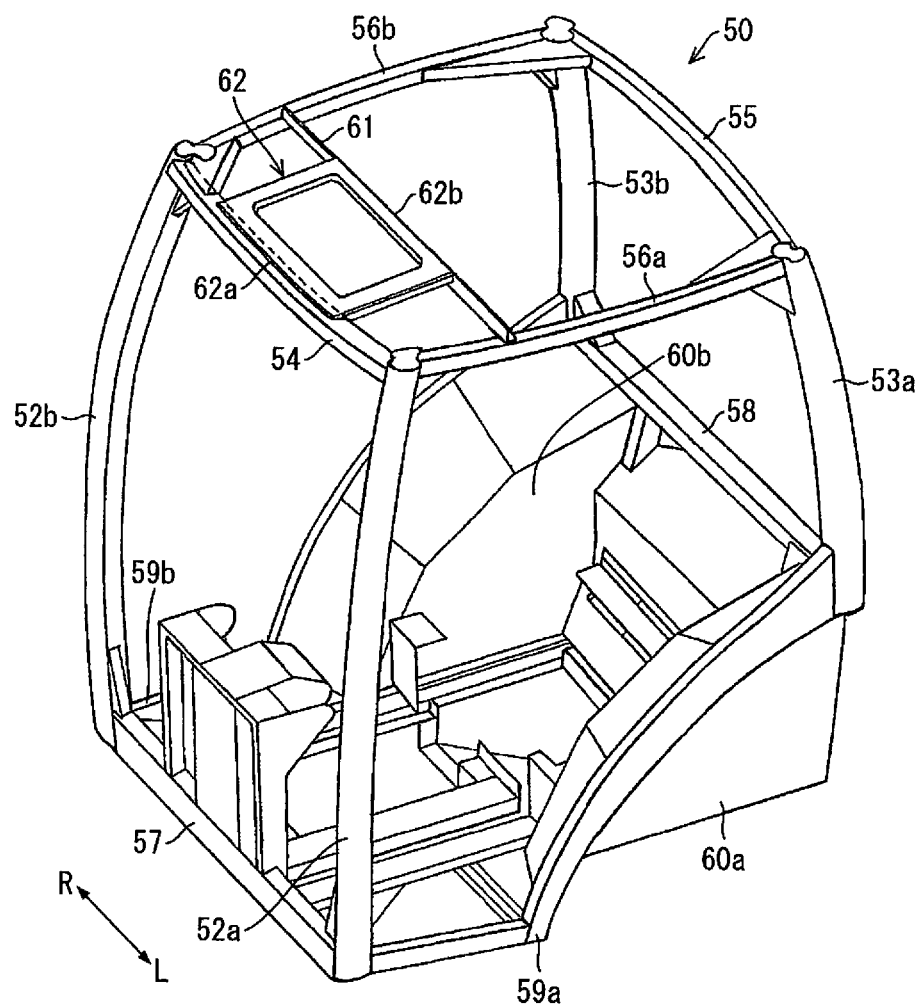
FIG. 3 is a view for describing an example of a cabin framework in accordance with the present embodiment.

FIG. 3 merely shows an example of the cabin framework 50 in accordance with the present embodiment. Alternatively, the cabin framework 50 can be achieved by a structure which is different from that illustrated in FIG. 3.

[Cabin-Protection Structure 30]

Figure 1:
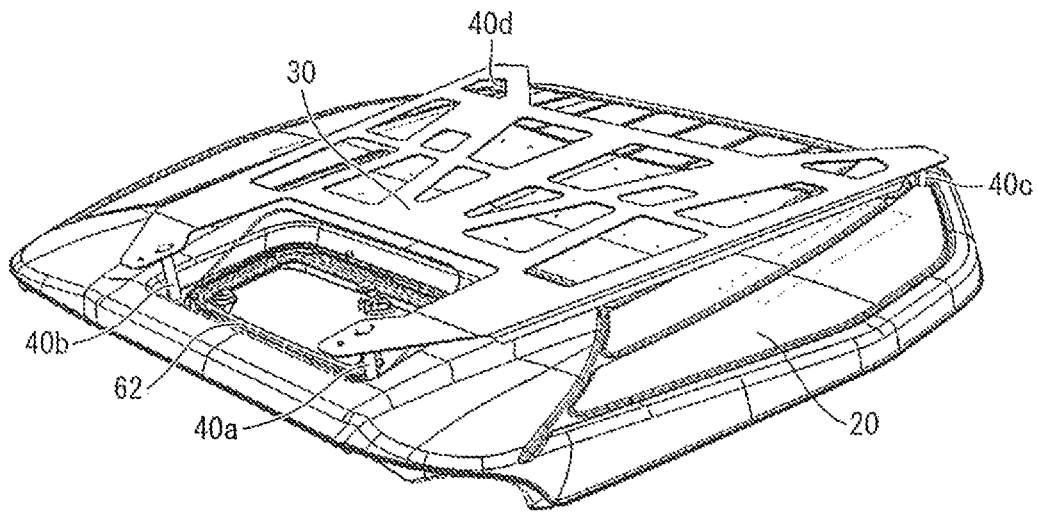
FIG. 1 is a view for describing an example of a cabin-protection structure in accordance with the present embodiment.

The cabin-protection structure 30 will be described below with reference to FIG. 1. FIG. 1 is a view for describing an example of the cabin-protection structure 30 in accordance with the present embodiment.

Examples of the function fulfilled by the cabin-protection structure 30 encompass (i) protection of an operator from a falling object and (ii) protection of an operator should a construction machine tip over and/or fall. The cabin-protection structure 30 is made of, for example, steel. However, provided that the function is fulfilled, the cabin-protection structure 30 can be made of any material and can have, for example, any shape, thickness, and size.

The cabin-protection structure 30 is provided above the roof 20 with the plurality of support members 40 which are provided between the cabin-protection structure 30 and the roof 20. Therefore, should a falling object strike the tractor including the cabin-protection structure 30, the cabin-protection structure 30 can protect not only an operator of the tractor 1 but also the roof 20. Specifically, the cabin-protection structure 30, may protect the operator of the tractor 1. Then, in addition, the cabin-protection structure 30 can considerably reduce damage to the roof 20 or even completely protect the roof 20 from damage.

When viewed from above, the cabin-protection structure has a substantially trapezoidal shape. The cabin-protection structure 30 is supported by four support members 40a through 40d at respective four corners of the cabin-protection structure 30.

The number of the plurality of support members can be any number that is 2 or more. The cabin-protection structure 30 can be provided above the roof 20 with one support member provided between the cabin-protection structure 30 and the roof 20. In such a case, the one support member is assumed to have strength which is sufficient to allow the cabin-protection structure 30 to fulfill the functions such as protection of an operator from a falling object.

An interval between a front-side pair of support members 40a and 40b among the four support members 40a through 40d is preferably identical to or narrower than an interval between a rear-side pair of support members 40c and 40d. Ordinarily, the support members 40a and 40b are located on a side where an operator sits. When the interval between the support members 40a and 40b is narrower, the cabin-protection structure 30 can more certainly protect the operator and/or the roof 20 from a falling object.

When the interval between the front-side pair of support members 40a and 40b is narrower than the interval between the rear-side pair of support members 40c and 40d, the following effects can also be obtained. Specifically, a surface of the cabin-protection structure 30, which surface is located on a side where the support member 40a and the support member 40c are located, will be referred to as "side surface A", and a surface of the cabin-protection structure 30, which surface is located on a side where the support member 40b and the support member 40d are located, will be referred to as "side surface B". In this case, the side surface A and the side surface B are each angled with respect to a direction in which the tractor 1 is advancing. Therefore, should a falling object strike the side surface A and/or the side surface B, an impact of the falling object on the cabin-protection structure 30 (or the tractor 1) can be distributed in directions which are oblique with respect to the direction in which the tractor 1 is advancing. This allows the tractor 1 to adequately protect an operator. In addition, since an impact on the tractor 1 is also reduced, damages to the tractor 1 itself can be reduced. Thus, when the interval between the front-side pair of support members 40a and 40b is narrower than the interval between the rear-side pair of support members 40c and 40d, various effects can be expected. These effects are directly related to safety of an operator and of the tractor 1. These reasons reveal that the tractor 1 can have improved usability.

The description of the cabin-protection structure 30 will be continued below.

The cabin-protection structure 30 is preferably open at a portion directly above the skylight of the roof 20. This allows the cabin-protection structure 30 to simultaneously (i) protect an operator from a falling object and (ii) secure visibility of the operator through the skylight.

The support members 40a and 40b are preferably fixed to the skylight frame 62. In this way, designing, processing, or the like of the roof 20 to fix the support members 40a and 40b can be unnecessary (examples of the processing encompass making holes through which bolts or screws are to be inserted). This may facilitate a process of producing and assembling the tractor 1.

Because of the reasons A) and B) below, the support members 40a through 40d are preferably configured so as to maintain a distance between the cabin-protection structure 30 and the roof 20 so that the distance falls within a certain range.

A) When the distance between the cabin-protection structure 30 and the roof 20 is above the certain range, there may be an increase in a load to be applied to the support members 40a through 40d when a falling object strikes the cabin-protection structure 30. This may invite additional caution when strength of the support members 40a through 40d is designed.

B) When the distance between the cabin-protection structure 30 and the roof 20 is smaller than the certain distance, there is a possibility that an impact of a falling object causes the cabin-protection structure 30 to come into contact with the roof 20, so that the roof 20 becomes damaged.

For these reasons, the distance between the cabin-protection structure 30 and the roof 20 is preferably adjusted by a length of each of the support members 40a through 40d. A proper distance between the cabin-protection structure 30 and the roof 20 varies, depending on the shape, the material, thickness, and the like of the cabin-protection structure 30. Therefore, the lengths of the support members 40a through 40d are decided in view of the material and the like of the cabin-protection structure 30. This makes it possible to maintain the distance between the cabin-protection structure 30 and the roof 20 within the certain range, and therefore deals with the reasons A) and B).

Note that the certain range can be decided by the following methods. For example, the shape, the material, the thickness, and the like of the cabin-protection structure 30 are variously changed, and then experiments, in each of which a falling object strikes the cabin-protection structure 30, are carried out. Then, the certain range is decided according to the results of each of the experiments. Alternatively, the certain range is decided according to the results of experiments in which falling of a falling object on the cabin-protection structure 30 is simulated.

The support members 40a through 40d will be further described below.

According to conventional tractors, a cabin framework and a cabin-protection structure are welded to each other. According to the conventional tractors, there was thus no technical idea of supporting the cabin-protection structure 30 with use of the support members 40a through 40d. The following description will discuss where to attach the support members 40a through 40d and effects of such placement.

The roof 20 is joined to the cabin framework 50 at a plurality of joining positions with use of, for example, (i) bolts and nuts or (ii) screws. The cabin-protection structure 30 is preferably provided above the roof 20 with the support members 40a through 40d which are provided between the cabin-protection structure 30 and the roof 20. At least some support members among the plurality of support members are attached to respective joining positions among the plurality of joining positions where the roof is jointed to the cabin framework. The support members 40a through 40d will be described in detail below. It is possible to provide that all of the respective support members be provided at the respective plurality of joining positions where the roof is jointed to the cabin framework. It is also possible that some of the support members be provided at the corresponding joining positions, and the remaining support members be provided at positions close to other joining positions. The number of support members is preferably at least the same as the number of joining positions, with at least some of the support members being provided at respective joining positions among the plurality of joining positions.

According to the tractor 1, the roof 20 and the cabin-protection structure 30 are joined together at four joining positions. In addition, it is assumed that the roof 20 and the cabin framework 50 are joined together at four joining positions. When the joining positions of the roof 20 and the cabin framework 50 are different from the joining positions of the roof 20 and the cabin-protection structure 30, a total number of joining positions is 8. Meanwhile, when the joining positions of the roof 20 and the cabin framework 50 are identical to the joining positions of the roof 20 and the cabin-protection structure 30, a total number of joining positions is 4. When the total number of joining positions is small, various effects can be expected. For example, it is possible to reduce a total number of holes which are to be made in the roof 20 and through which bolts or screws are to be inserted. This facilitates design, production, and processing of the roof 20. In addition, since the number of bolts or screws necessary are dependent on the number of holes, a smaller number of holes may allow for a greater reduction in the number of bolts or screws.

The joining positions of the roof 20 and the cabin framework 50 and the joining positions of the roof 20 and the cabin-protection structure 30 can be made identical by, for example, the following method.

It is assumed that the roof 20 and the cabin framework 50 are joined together with use of four bolts. In this case, there are four holes 21a through 21d made in the roof 20 so that the four bolts are to be inserted through the four holes 21a through 21d, respectively. It is also assumed that there are four holes 30a through 30d made in the cabin-protection structure 30. It is also assumed that positions of the holes 30a through 30d correspond to positions of the holes 21a through 21d, respectively.

In this case, (1) the four bolts, which join the roof 20 and the cabin framework 50 together, are removed and (2) the four holes 21a through 21d of the roof 20 are opened. Then, (3) four bolts for fixing the cabin-protection structure 30, the roof 20, and the cabin framework 50 together are inserted through the holes 21a through 21d and into the holes 30a through 30d and then (4) the four bolts are finally tightened with corresponding nuts. This allows the joining positions of the roof 20 and the cabin framework 50 and the joining positions of the roof 20 and the cabin-protection structure 30 to be identical.

Note that it is possible to increase the strength of the support members 40a through 40d by using collars when the bolts are inserted in the step (3) above. In the present embodiment, a bolt and a nut and/or a collar are collectively referred to as "support member".

With the method including the steps (1) through (4) above, it is possible to cause the cabin-protection structure 30 to be detachable from the roof 20. This allows a height of an entire portion of the tractor 1 to be adjusted, and, as a result, allows the tractor 1 to be accommodated in more places.

The steps (1) through (4) facilitate performance thereof by a user of the tractor 1. Specifically, it may be possible for the user of the tractor 1 to remove and attach the cabin-protection structure 30 without others' help. Therefore, when, for example, the cabin-protection structure 30 breaks, a new cabin-protection structure 30 may be obtained, without replacing the tractor 1. Alternatively, it is possible to attach a cabin-protection structure 30 to another tractor owned by the user. The cabin-protection structure 30 in accordance with the present embodiment can be thus designed, produced, processed, repaired, or replaced, independently of the tractor 1. The tractor 1 has improved usability in this regard also.

Likewise, the cabin 12, which includes the cabin-protection structure 30 and the roof 20, can be designed, produced, processed, repaired, or replaced, independently of the tractor 1. The tractor 1 including such a cabin 12 can also bring about the various effects described above.

Such a tractor 1 can be used for, for example, agriculture, forestry, and civil engineering works.

The present disclosure is not limited to the embodiments, but can be altered by a skilled person in the art within the scope of the claims. The present disclosure also encompasses, in its technical scope, any embodiment derived by combining technical means disclosed in differing embodiments.

Even though some features, concepts or aspects of the embodiments may be described herein as being a preferred (more or less) arrangement or method, or advantageous, such description is not intended to suggest that such feature is required or necessary unless expressly so stated.

Specific values for described elements should be understood to be within accepted manufacturing or industry tolerances known to one of skill in the art, and any use of the terms "substantially" and/or "approximately" and/or "generally" should be understood to mean falling within such accepted tolerances.

REFERENCE SIGNS LIST

1 Tractor
2 Body frame
3, 3 Front wheel
4, 4 Rear wheel
5 Engine
6 Flood
7 Transmission
8 Steering wheel
11 Seat
12 Cabin
12a Space
20 Roof
30 Cabin-protection structure
40 and 40a through 40d Support member
50 Cabin framework
52a, 52a and 52b, 52a and 53a, 52b, 53a and 53b Supporting column
54, 55, 56a, 56a and 56b, 56b, 58, 59a and 59b Beam
60a, 60b Side panel
61 Skylight attachment beam
62 Skylight frame
62a Front-side frame
62b Rear-side frame

The invention claimed is:

1. A tractor, comprising:
a cabin framework;
a roof provided above the cabin framework; and
a cabin-protection structure, the cabin-protection structure being provided above the roof with a plurality of support members which are provided between the cabin-protection structure and the roof;
wherein, the plurality of support members include a front pair of support members and a rear pair of support members configured to support the cabin-protection structure;
an interval between each of the front pair of support members is narrower than an interval between each of the rear pair of support members;
the roof comprises a skylight; and
the front pair of support members are fixed to a skylight frame that defines the skylight.

2. The tractor according to claim 1, wherein
the cabin-protection structure is open at a portion directly above the skylight.

3. The tractor according to claim 1, wherein
the roof is fixed to the cabin framework at a plurality of positions.

4. The tractor according to claim 3, wherein
at least some support members among the plurality of support members are provided at respective positions among the plurality of positions.

5. The tractor according to claim 1, wherein
the cabin-protection structure is detachable from the roof.

6. The tractor according to claim 1, wherein
the cabin framework defines a cabin containing an operation device.

7. A tractor, comprising:
a cabin framework that defines a cabin containing an operation device;
a roof provided above the cabin framework; and
a cabin-protection structure provided above the roof;
wherein, the roof is fixed to the cabin framework at a plurality of positions;
the cabin-protection structure is provided above the roof with a plurality of support members which are provided between the cabin-protection structure and the roof;
the plurality of support members include a front pair of support members and a rear pair of support members configured to support the cabin-protection structure;
an interval between the front pair of support members is narrower than an interval between the rear pair of support members;
the roof has a skylight; and
the front pair of support members are fixed to a skylight frame that defines the skylight.

8. The tractor according to claim 7, wherein the cabin-protection structure is detachable from the roof.

9. The tractor according to claim 7, wherein:
the cabin-protection structure is open at a portion directly above the skylight.

10. The tractor according to claim 7, wherein at least some support members among the plurality of support members are provided at respective positions among the plurality of positions.

11. The tractor according to claim 7, wherein
the plurality of support members maintain a distance between the cabin-protection structure and the roof within a certain range.

* * * * *